United States Patent [19]
Chun et al.

[11] Patent Number: 5,509,460
[45] Date of Patent: Apr. 23, 1996

[54] SOLID/LIQUID INTERFACE DETECTION IN CONTINUOUS CASTING PROCESSES BY γ-RAY ATTENUATION

[75] Inventors: Jung-Hoon Chun, Sudbury; Richard C. Lanza, Brookline; Nannaji Saka, Cambridge, all of Mass.

[73] Assignee: Massachusetts Institute of Technology, Cambridge, Mass.

[21] Appl. No.: 296,342

[22] Filed: Aug. 25, 1994

[51] Int. Cl.⁶ .......................... B22D 11/20; B22D 11/22; B22D 11/16
[52] U.S. Cl. .......................... 164/454; 164/455; 164/413; 164/414
[58] Field of Search .................................... 164/454, 455, 164/413, 414, 151.2, 151.5

[56] References Cited

U.S. PATENT DOCUMENTS

| | | | |
|---|---|---|---|
| 3,270,376 | 9/1966 | Thalmann | 164/413 |
| 3,668,386 | 6/1972 | Blecherman et al. | 250/43.5 |
| 3,668,392 | 6/1972 | Bajek et al. | 250/43.5 D |
| 4,342,911 | 8/1982 | French | 250/258 |
| 4,433,242 | 2/1984 | Harris et al. | 250/358.1 |
| 4,520,266 | 5/1985 | Fletcher et al. | 250/357.1 |
| 5,300,781 | 4/1994 | DiMartino | 250/357.1 |
| 5,379,237 | 1/1995 | Morgan et al. | 364/578 |

OTHER PUBLICATIONS

Chu, M. G., "A Novel Technique for Outlining the Solidification Crater Profile of a Commercial-Size Aluminum Alloy Ingot Cast by the Direct Chill Method," *Metallurgical Transactions, A*, 23A:2323–2326 (Aug. 1992).

G. N. Deryabina, et al., "Measuring the Ratio of Liquid and Solid Phases in a Continuously Cast Ingot," *S. Ordzhonikidze Azovstal Zhdanovsk Metallurigical Plant* (22 Jan. 1979), with English Abstract and translation.

*Primary Examiner*—Richard K. Seidel
*Assistant Examiner*—I.-H. Lin
*Attorney, Agent, or Firm*—Hamilton, Brook, Smith & Reynolds

[57] ABSTRACT

A liquid metal/solid metal interface detecting device comprises in general a radiation source for generating gamma radiation, which is directed to pass through a strand extruded from a continuous casting mold. A detector detects the gamma radiation passing through the partially solidified strand to determine a spatial profile for a liquid metal/solid metal interface by relying on the different gamma radiation attenuation characteristics of the solid metal and the liquid metal. Preferably, the gamma radiation is at energies of greater than one million electron volts. In some embodiments, a movable support carries the radiation source and the detector and moves the radiation source and detector along and around the ingot enabling generation of a three-dimensional profile of the liquid metal/solid metal interface by utilizing tomographic imaging techniques. Alternatively, solidification at a single region is determined and this information is used to control the formation of the strand in process controller implementations.

34 Claims, 4 Drawing Sheets

SOLID/LIQUID INTERFACE DETECTION IN CONTINUOUS CASTING PROCESSES BY γ-RAY ATTENUATION

BACKGROUND OF THE INVENTION

Continuous casting is a technique for producing long cross-sectionally constant strands, or castings, such as slabs, billets, blooms, etc. These strands are produced by continuously pouring molten casting material, such as steel, through a mold in which it is allowed to harden partially before being drawn out.

The particular crystalline structure of the finished strand is affected by the freezing process in which a solidification front, or liquid metal/solid metal interface, traverses through the cooling casting material from the lower temperature regions to the higher temperature regions. Both the progression and velocity of the solidification front and its shape determine or affect the crystalline structure of the casting material and thus the mechanical characteristics of the final strand. Information regarding the exact profile of the interface is also important for optimizing magnetic stirring and soft reduction techniques employed to minimize phase segregation in high-alloy steel casting. Moveover, casting speed is limited largely by the location of the tip of the interface.

The solidification front, or the liquid metal/solid metal interface, progresses through the inside of the casting, since usually heat passes out of the object at its boundary with the environment. Consequently, it is very difficult to observe or even monitor.

A common method for predicting the profile and progression of the front is by computer estimation of heat flow throughout the strand. Unfortunately, the heat transfer phenomena associated with the process are very complex, and thus the position of the interface cannot be established at any one time with great accuracy. Moreover, since the calculations are complicated, automatic control of the variables in a continuous casting process can not be accomplished in real-time. Furthermore, rapid fluctuations in the interface and the instabilities associated with the freezing process can not be detected. Consequently, the conventional casting process is run on a semi-empirical basis such as by adjusting the rate of withdrawal of the strand, controlling the flow rate of coolant, and adjusting the temperature of the hot molten casting material. These procedures are run on a trial-and-error basis. As a result, it is not uncommon that many strands of sub-optimal microstructure and properties are produced and must be discarded or remelted.

Methods for detecting solidification fronts exist. These methods, however, are generally limited to non-metallic low melting temperature materials and cannot be used in the casting of high temperature metals and alloys on an industrial scale. The metal casting temperatures are very high and the processing speeds too fast.

SUMMARY OF THE INVENTION

The present invention exploits the attenuation of high energy γ-rays by materials. Specifically in the context of metals casting, by employing high energy γ-rays on the order of MeV (million electron Volts) enough energy is provided so that some of the γ-rays can penetrate and pass entirely through the strands. At these energies, the mass attenuation for many materials is very similar. Thus, the total attenuation per length of material traversed depends only on the density of the material. Since the densities of liquid and solid metals, for example, differ by approximately two to ten percent, the proportion of liquid metal to solid metal in a length of cooling metal casting can be determined. Thus, the characteristics and progression of the solidification front or liquid metal/solid metal interface can be determined in the metal strand immediately after its extrusion from a continuous casting mold.

In general, according to one aspect, the invention is set in the context of a continuous casting machine. This caster includes a source of molten material, a continuous casting mold for casting the molten material, and a cooling zone, downstream of the continuous casting mold for cooling and solidifying material extruding from the mold. A device for measuring a liquid material/solid material interface in the partially solidified material is employed which comprises a radiation source generating electromagnetic radiation for penetrating the partially solidified material and a detector for detecting the electromagnetic radiation passing through the partially solidified material.

In specific embodiments, the detector determines a spatial profile of the liquid material/solid material interface in response to the detected electromagnetic radiation. Further, the electromagnetic radiation can be γ-rays having energies of greater than one million electron Volts.

In other preferred embodiments, the detector determines a spatial profile of the liquid material/solid material interface by relying on different γ-ray attenuation characteristics of the solid material and the liquid material. Further, collimators can be provided for collimating and guiding the electromagnetic radiation from the radiation source through the material to the detector.

In still other embodiments, a movable support carries the radiation source and the detector and moves the radiation source and detector. Such a detector can then determine a longitudinal profile of the liquid material/solid material interface by comparing the attenuation of the electromagnetic radiation longitudinally along the interface.

In still another embodiment, the radiation source and the detector are rotated around the ingot. Such a detector can then determine a horizontal profile of the liquid material/solid material interface in response to the horizontal rotation of the radiation source and the detector.

In general, according to a different aspect, the invention features a device for determining the characteristics of a liquid metal/solid metal interface in a partially solidified strand in a continuous casting machine. Such a device comprises a radiation source for generating gamma radiation. This radiation passes through the partially solidified strand extruded from a continuous casting mold. Additionally, a detector is included which detects the gamma radiation passing through the partially solidified strand to determine a spatial profile of the liquid metal/solid metal interface by relying on the different gamma radiation attenuation characteristics of the solid metal and the liquid metal.

In general, according to still another aspect, the invention features a method for determining a spatial profile of a liquid metal/solid metal interface in a partially solidified strand extruding from a continuous casting mold. Such a method comprises illuminating the strand with penetrating radiation and detecting the electromagnetic radiation passing through the strand to determine a spatial profile of the liquid metal/solid metal interface by relying on the different γ-ray attenuation characteristics of the solid metal and the liquid metal.

In general, according to still a further aspect, the invention features a device for controlling a continuous casting machine. This device comprises a radiation source for generating gamma radiation. The radiation passes through a partially solidified strand extruded from a continuous casting mold. A detector then detects the gamma radiation passing through the partially solidified strand to detect a degree of solidification of the strand. From this information, a controller, responsive to the detector, controls the casting machine.

In specific embodiments, the controller controls at least one of a rate of withdrawal of the strand, coolant flow to the strand, and a temperature of molten metal provided into the continuous casting mold in response to the detected degree of solidification of the strand.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed and various and numerous embodiments without the departing from the scope of the invention.

BRIEF DESCRIPTION OF THE DRAWINGS

In the accompanying drawings like reference characters refer to the same parts throughout the different views. The drawings are not necessarily to scale. Emphasis is instead placed upon illustrating the principles of the invention. Of the drawings.

DETAILED DESCRIPTION OF THE PREFERRED EMBODIMENT

Figure 1:
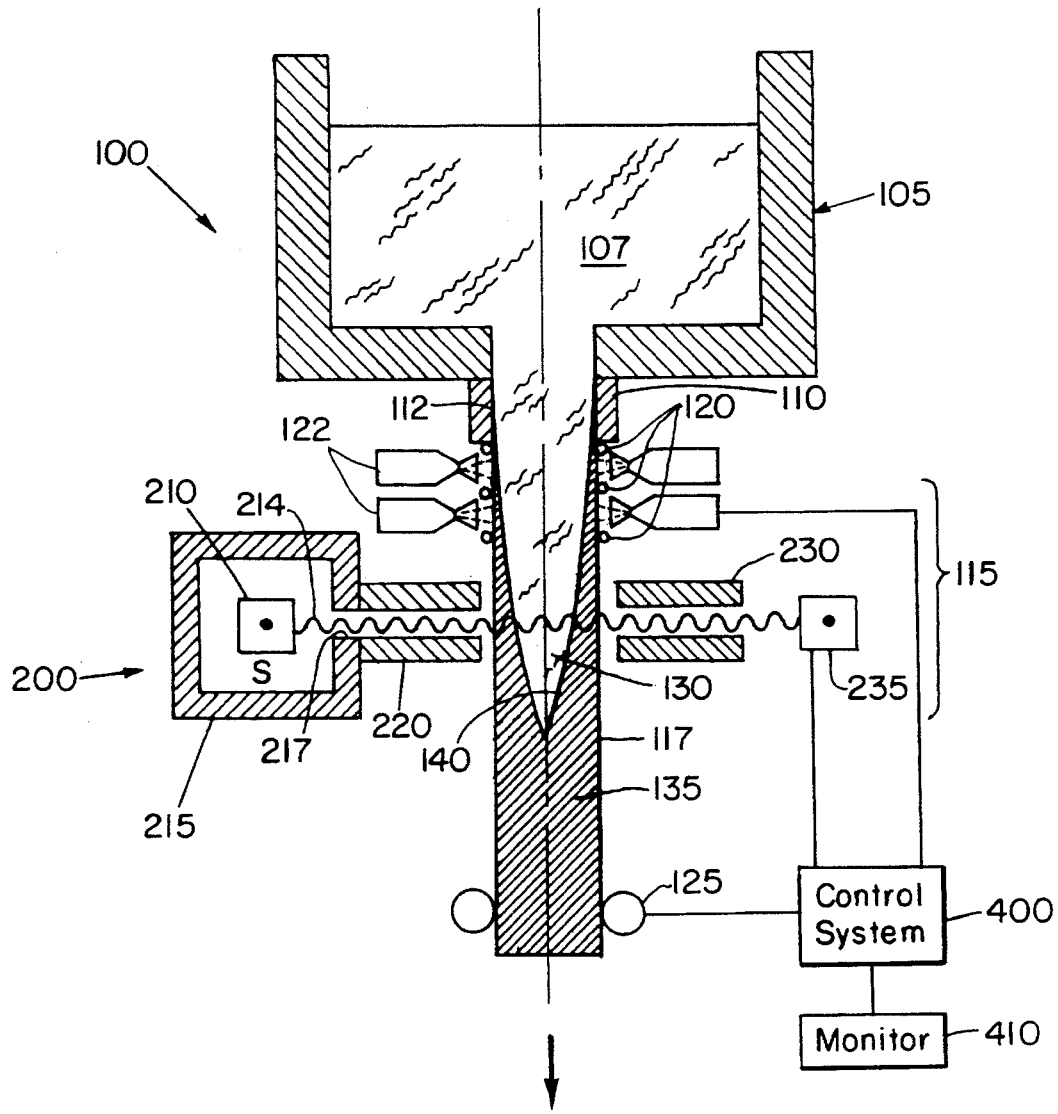
FIG. 1 schematically shows a side cross-sectional view of a continuous casting machine of the present invention including a liquid metal/solid metal interface detector.

Turning now to the figures, a continuous casting machine 100 constructed according to the principles of the present invention is schematically illustrated in FIG. 1. Generally, the invention utilizes conventional continuous casting techniques to generate the strands. As in most continuous casting machines, a crucible or tundish 105 acts as a source of molten metal 107. This molten metal 107 flows from the tundish 105 into a water cooled mold 110. Freezing or solidification of the molten metal begins in the mold 110 and continues progressively as the strand 117 moves through the casting machine 100. The freezing of the molten metal begins as the thin layer 112 which is in direct contact with the cooled mold 110. Sticking of the partially solidified strand to the walls of the mold is prevented by vertically oscillating the mold 110. Friction can be further reduced by the introduction of lubricants.

Downstream of the water cooled mold 110, in a second cooling zone 115, containment rollers 120 provide lateral support and counteract the static internal pressure of the molten metal within the partially solidified strand. Simultaneously, jets of water from nozzles 122 are directly sprayed onto the strand 117 to remove heat and facilitate the continued freezing. Finally, downstream of the second cooling zone 115, drawing rollers 125 grip the strand 117 at a point at which the entire cross section of the strand is frozen. These drawing rollers 125 essentially pull the strand 117 through the mold 110.

It is a characteristic of the strand 117 in the continuous casting machine 100 that a long tongue 130 of molten metal extends down through a center portion of the strand 117 within the second cooling zone 115. In the continuous casting of low-alloy steels, the tongue can be as long as ten meters although the typical mold is less than a meter long. This molten metal tongue 130 is demarcated from the solid or frozen metal 135 by the solidification front or liquid metal/solid metal interface 140. The solidification or freezing of the strand is not an instantaneous process but begins along the outer surface where the cooling effects of the mold 110 and the water from the water jet nozzles 122 are present.

The inventive continuous casting machine 100 further includes a liquid metal/solid metal interface detector 200. This detector has an electronic or radioisotopic radiation source 210 which generates $\gamma$-rays 214. These gamma rays have energies greater than approximately 1 MeV, ideally between 5 and 10 MeV. Although a variety of energies are possible, this range tends to be optimal for most contemplated applications. At higher energies there are difficulties in ensuring adequate shielding for workers and general environmental safety whereas lower energies can not adequately penetrate the thick strands which are found in most continuous casting machines. Further, higher energies tend to be more expensive to generate, but provide better resolution.

An electron linear accelerator (LINAC) or a radioisotope such as radioactive cobalt-60 can be used to generate the gamma radiation. Although the LINACs do not provide monoenergetic radiation as is a characteristic of the radioisotopes, the relatively slow variation of attenuation with energy characteristic of high energy $\gamma$-rays makes such beam hardening relatively small.

A shielding container 215 has an aperture 217 through which the $\gamma$-rays 214 are emitted. A first collimator 220 between the aperture 217 and the strand 117 collimates and directs the $\gamma$-rays to pass through the strand. On the opposite side of the strand 117 from the shielding container 215, a second collimator 230 receives the $\gamma$-rays that have passed through the cast metal and guides them to a penetration detector 235. The second collimator 230 enables the penetration detector 235 to reside a safe distance from the hot partially solidified strand 117 but more importantly eliminates radiation that has been scattered from other parts of the strand or other equipment. This implementation in which the collimators are used on both the radiation source and detector preventing scattered radiation from reaching the detector is known as a "good geometry" experiment.

The $\gamma$-ray radiation incident on the casting interacts with the liquid 130 and solid 135 casting metal according to two principle mechanisms which attenuate the beam of radiation. First, photoelectric interaction, $\Sigma_a$, is strongly dependent on the atomic number of the elements in the casting metal, generally denoted as Z, and on the energy of the $\gamma$ radiation, $E_\gamma$. The photoelectric interaction can be approximated by the following equation:

$$\Sigma_a = K_a \left[ \frac{Z^{3.6}}{E_\gamma^{3.15}} \right] \rho_e$$

where $\rho_e$ is the density and $K_a$ is a constant. For incident radiation, the photoelectric interaction tends to be negligible because it is inversely proportional to the cube of the energy of the γ radiation and here the energies are on the order of million electron Volts.

Secondly, Compton interaction, the scattering of the γ-rays off of the electrons, is dependent upon the electron density of the material and only weakly on the energy. For virtually all elements, the ratio of the atomic weight to the atomic number is essentially two. Therefore, at very high energies, Compton scattering is only proportional to the density and not on its elemental composition and is approximated by:

$$\Sigma_S = K_S \frac{1}{E_\gamma} \rho_e$$

As a result, the intensity of the γ-rays detected by the penetration detector 235 is almost entirely determined by the Compton scattering and thus is directly related to the average density along the path of the γ-rays. Since the densities of the liquid and solid metals 130, 135 are different by between two and ten percent, the path length in the liquid metal can be calculated by a data acquisition and control system 400 from the γ-ray intensity at the penetration detector 235. Thus, from the total thickness and composition of the partially frozen cast metal, it is possible to estimate the liquid or solid fraction of metal along the path of the γ-rays.

Ideally, during the continuous casting process, the speed of the solidification front 140 along the longitudinal direction of the strand 117 precisely matches the speed of the strand 117 in the downward direction. The net result of this process is that the tongue of molten metal 130 extending down the center of the cast metal is essentially stationary with respect to the casting machine 100 even as the strand 117 is being continuously pulled through the mold 110. The information regarding liquid/solid metal fraction from the interface detector 200 is used by the data acquisition and control system 400 as a process controller. For example, the speed withdrawal of the strand by the drawing rollers 125 can be increased or decreased or the flow rate of coolant changed to yield the desired solidification front profile and position. In the context of productivity, the location of the tip of the front 140 is determined by the control system 400 to achieve maximal withdrawal while ensuring the tip does not interfere with downstream processes such as the cutting of the strand 117.

Further information can be derived by also detecting the γ-rays that were scattered by the strand 117. As shown in the plan view of FIG. 2A, a scattering detector 240 is provided with a corresponding third collimator 245. By detecting the scattered γ-rays, the elemental composition of the ingot 117, including any alloying metals, can be estimated.

The scattering of the radiation due to the Compton interaction produces γ-rays of the lower energy which may be further scattered to a point where the photoelectric interactions become important. In this case, the ratio of scattered to transmitted radiation, $$\frac{\Sigma_a}{\Sigma_S},$$

is strongly dependent upon the average atomic number of the casting material, $Z_{avg}$, and is given by the equation:

$$\frac{\Sigma_a}{\Sigma_S} = K(E_\gamma) Z_{avg}^{3.6}$$

By comparing the response of the scattering detector 240, to the response of the penetration detector 235, the elemental composition of the casting metal can be determined. This ratio of scattered to transmitted radiation can be used to measure the effective atomic number of the casting material and, for alloys, the composition of the casting material. For example, a mixture of iron, atomic number 26, and chromium, atomic number 24, would have an effective atomic number that varies from 26.0 to 25.4 when the fraction of chromium varies from 0 to 20 percent.

The time to detect and measure precisely the path length in the liquid metal depends on the strength of the radiation source 210, the sensitivity of the penetration detector 235, and the total path length through the metal and ancillary metal components and structures of the continuous casting apparatus. The total attenuation of, for example, a beam of radiation may be substantial and may, therefore require an unreasonably large radiation source. For this reason, the use of non-radioisotopic radiation sources may be necessary for large casting systems, particularly for dense material, such as steels. Also, the attenuation coefficients for most materials is still declining at energies characteristic of cobalt-60 rays and does not exhibit the desired elemental independence until two to three MeV energies for γ-rays. Electronic sources such as from the LINACs are the equivalent of impractically large cobalt-60 sources and have the further advantage of controllability.

In some models of the detector 200, only a single fixed view will be necessary to control the continuous casting. The single view can be used as a feedback to allow compensation of simplified numerical models of the cooling strand 117 with sufficient accuracy to achieve the desired quality and production control. From this information, at least one of a rate of withdrawal of the strand 117, coolant flow to the strand, and a temperature of molten metal 107 provided into the continuous casting mold 110 is changed to yield the strand of desired characteristics. To establish process parameters in experimental test runs, exotic alloys, complex strand cross-sections or discrete casting, a 2-dimensional or full 3-dimensional image of the liquid/solid interface is required.

Figure 2A:
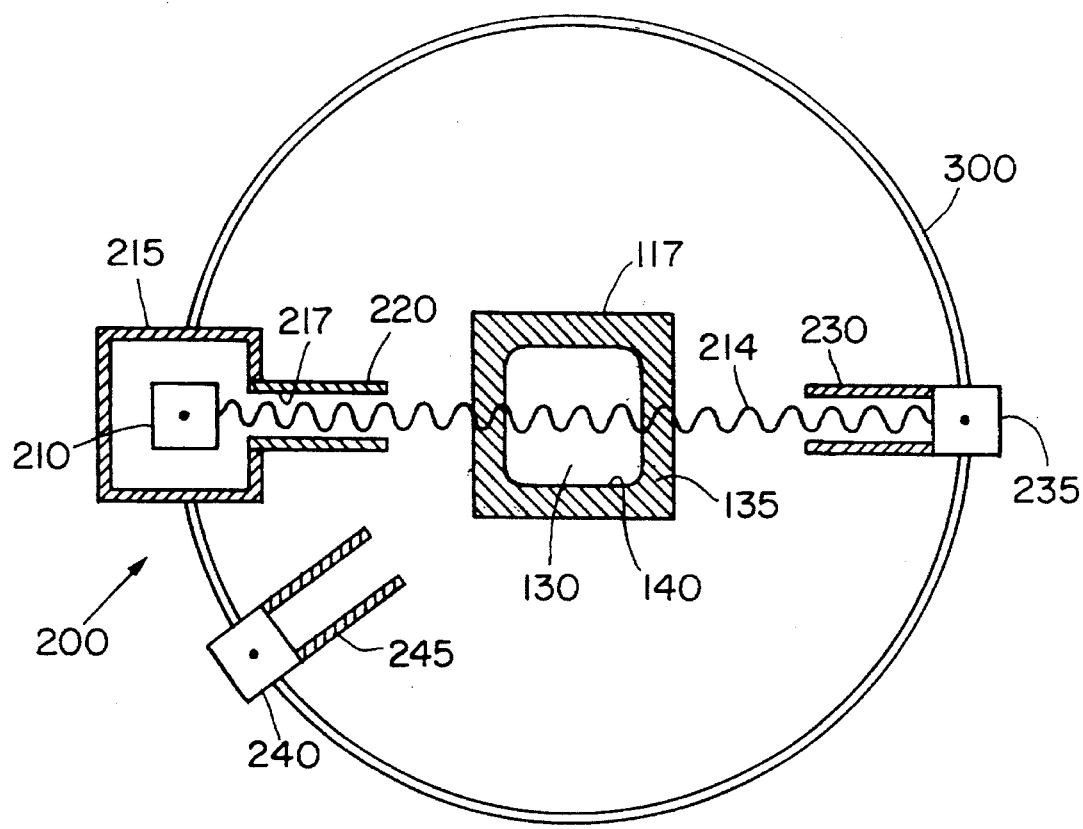
FIG. 2A and 2B are a schematic horizontal cross-sectional view and top view of a second embodiment of a liquid metal/solid metal interface detector of the invention.
Figure 2B:
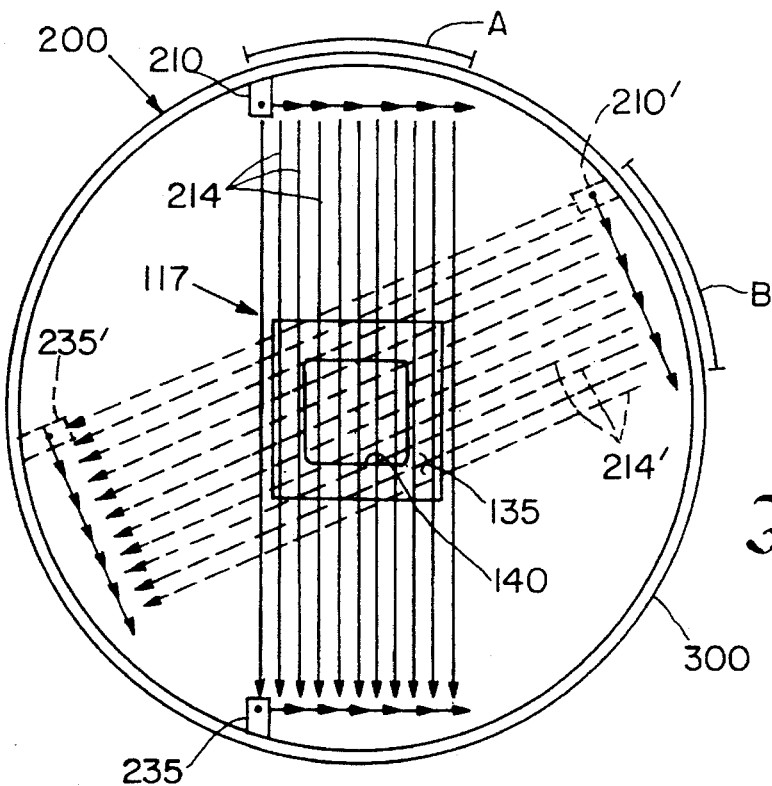

FIG. 2A also illustrates the characteristic features of a second embodiment of the continuous casting machine. Here, the radiation source 210, penetration detector 235, scattering detector 240, and collimators 220, 230, 240 are placed on a horizontal circular track 300. This embodiment is adapted to image a horizontal two-dimensional slice of the liquid/solid metal interface 140 by combining a number of views or perspectives through the strand. More specifically, as shown in FIG. 2B, a parallel set of pencil beams 214 is directed through the strand 117 by stepping the radiation source 210 and the penetration detector 235 in synchronism in opposite directions along the track 300 on opposed sides of the strand 117. During the stepping, both the radiation source 210 and the detector 235 are pivoted on the track so that the pencil beams 214 along the segment A of track 300, for example, are mutually parallel. This process is then repeated for another segment B to generate parallel pencil beams 214'. Alternatively, the source and detection 235 may be moved on a chord of the circular track to eliminate the rotational requirements. From the resulting information on the attenuation of beams 214, 214', well known tomographic imaging techniques, including filtered back projection, are utilized to reconstruct the two-dimensional distribution of the density and hence the solid/liquid interface 140 for the horizontal slice across the strand 117. An image of the interface 140 is then be displayed on a monitor 410. These techniques are capable of measuring a continuous density distributions from liquid to solid and thus are very useful for alloys that exhibit a solid/liquid interface which is not discrete such as the so-called "mushy" region.

Tomographic reconstruction methods are well known from the literature as for example in the work by Brooks and DiChiro (R. A. Brooks and G. DiChiro, "Principles of Computer Assisted Tomography and Radioisotopic Imaging", Phys. Med. Biol., 21, 689–732, 1976), which is incorporated herein by this reference, or for example the work by Huesman, et al. (G. Huesman, G. T. Gulberg, W. F. Greenberg, and T. F. Budinger, *Donner Algorithms for Reconstruction Tomography*, Lawrence Berkeley Laboratory Pub. 214, 1977) which gives specific computer programs for such reconstruction techniques as might be applied here and which is incorporated herein by this reference. Further these techniques can also be extended to apply to those cases where the number of viewing angles is limited as for example in the work of Rossi and Willsky (D. J. Rossi and A. S. Willsky, "Reconstruction from projections based on detection and estimation of Objects—Parts I and II: Performance Analysis and Robustness Analysis", IEEE Trans. Acoustics, ASSP-32, 886–906, 1984) which is incorporated herein by this reference. The beam of radiation may be a narrow pencil beam or may be a fan shaped beam originating at the LINAC. The choice will be dependent on the required speed and number of detectors to be used. The reconstruction techniques remain, however, identical.

Figure 3:
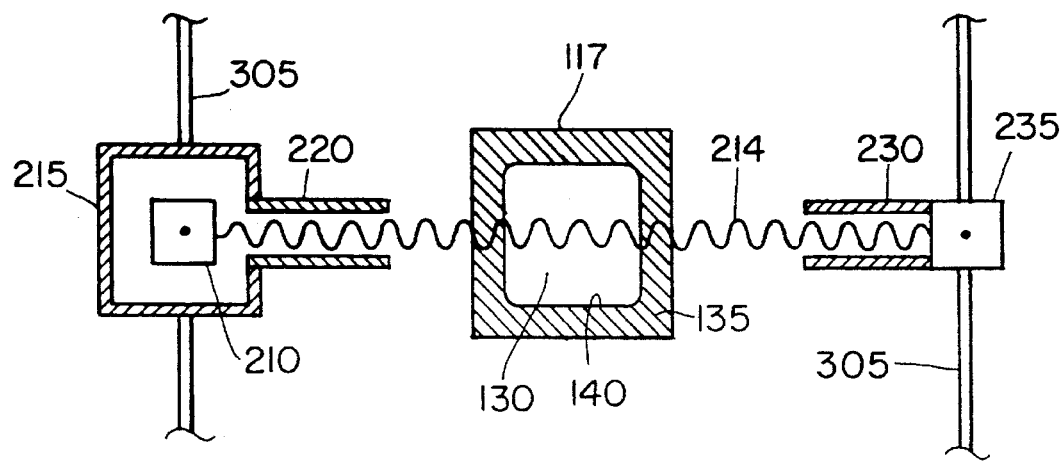
FIG. 3 is a schematic horizontal cross-sectional view of a third embodiment of the inventive interface detector.

FIG. 3 illustrates a third embodiment of the invention. This configuration is also capable of determining the two-dimensional density distribution of the solidifying strand 117. Here, however, linear tracks 305 are used in place of the circular track 300 to generate the multiple views.

Figure 4B:
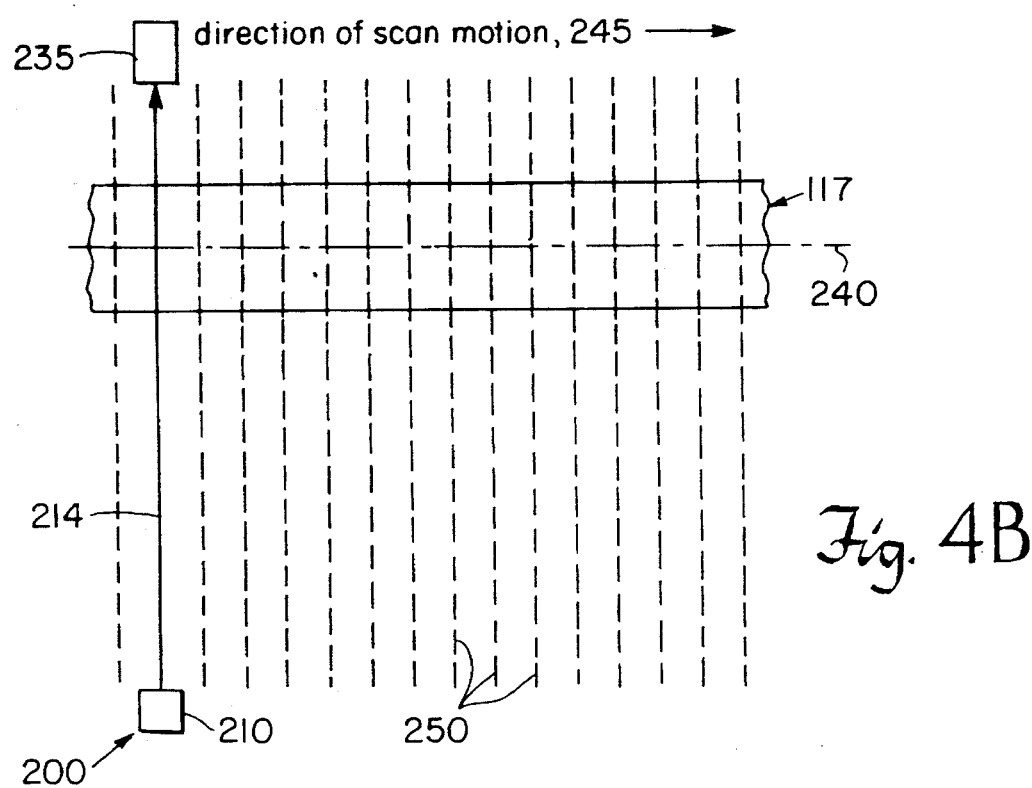
FIG. 4A and 4B are schematic side cross-sectional views of a fourth embodiment of the inventive interface detector.
Figure 4A:
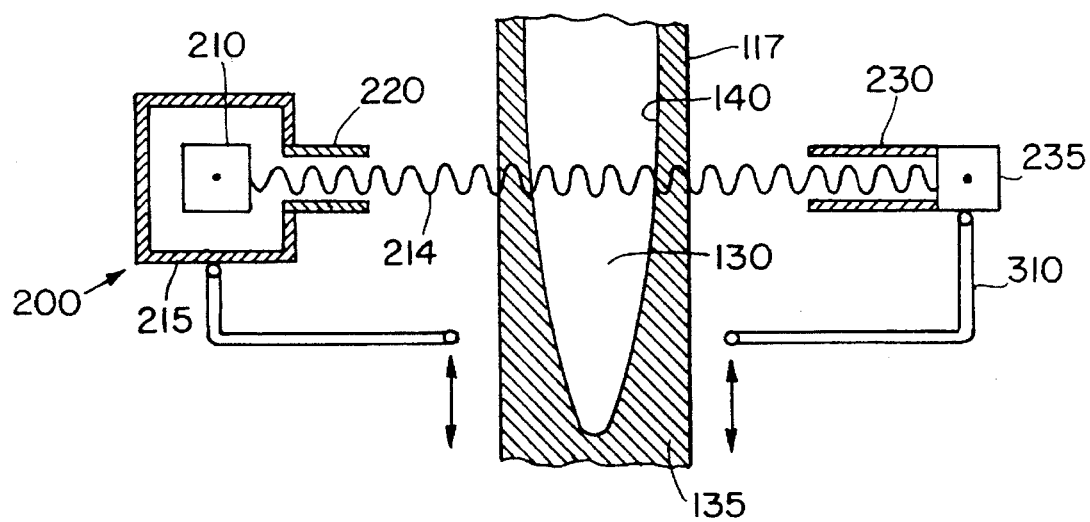

The longitudinal profile can be established using the fourth embodiment shown in FIG. 4A. Here, a vertically movable frame 310 carries the detector 200 enabling the generation of a number of views using pencil beam 214 along the longitudinal axis of the strand 117 as shown in Fig. 4B. Specifically, the direction of scan 245 is parallel to the longitudinal axis 240 of the stand 117 thereby generating a series of discrete views 250. Consequently, this fourth embodiment determines the longitudinal profile of the interface 140. By combining this longitudinal movement with the two dimensional slices generated by the embodiment of FIGS. 2A and 2B, a full three-dimensional image of the interface 140 is generated.

Figure 5:
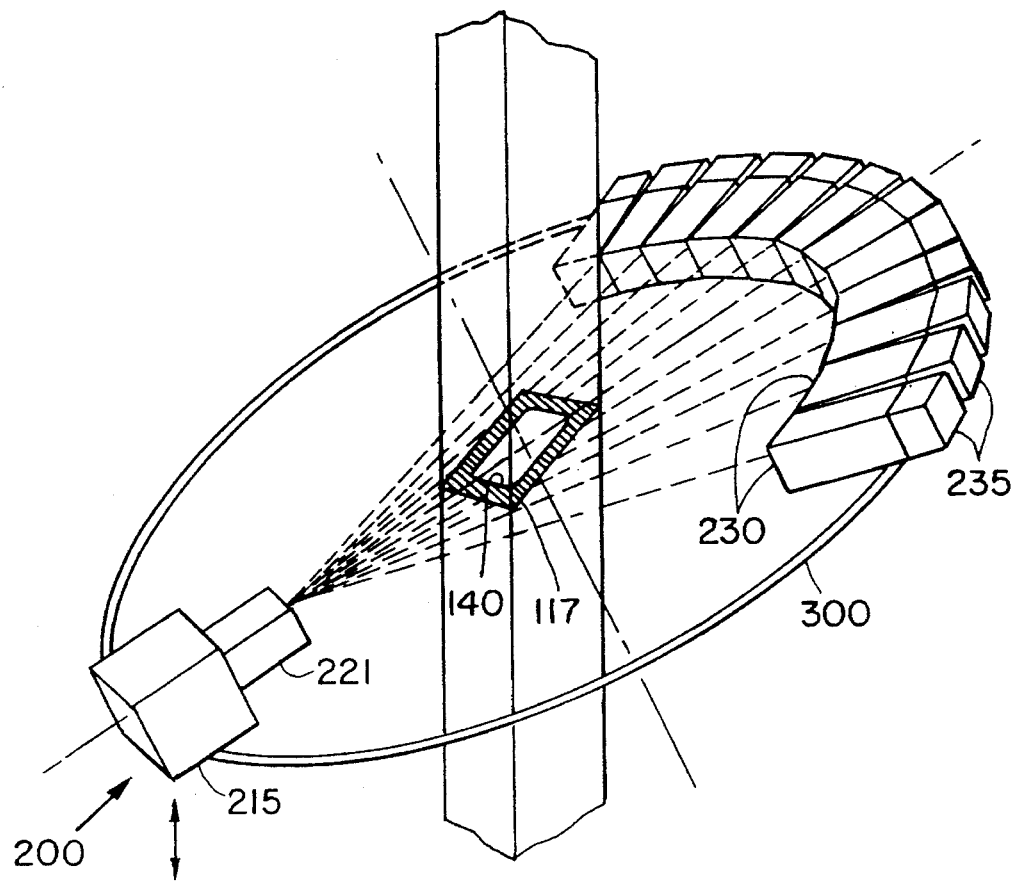
FIG. 5 is perspective view of a fifth embodiment of the inventive interface detector.

Finally, FIG. 5 is a perspective of a fifth embodiment which eases the requirements for moving the interface detector 200. In this embodiment, a fan collimator 221 forms a plane or beam of the γ-rays. Then, multiple detectors 235 are positioned on the far side of the strand 117 to detect the amplitude of the γ-rays along a variety of paths. As a result multiple views are generated at each circumferential position along circular track 300. Further, the circular track 300 is adapted to incline and move longitudinally along the strand to generate the three-dimensional profile of the interface 140 to a greater resolution.

Although the invention has been particularly described with regard to metal casting, this same basic configuration could also be used in semi-conductor crystal growth, for example. Crystal growth of GaAs or HgCdTe requires close monitoring of the solidification of the crystalline semiconductor. By appropriate selection of the γ-ray energy, the detector 200 can be used to monitor the progression of the crystal growth. Interestingly, in the semi-conductors, the liquid is more dense than the solid in most cases.

While this invention has been particularly shown and described with references to preferred embodiments thereof, it will be understood by those skilled in the art that various changes in form and details may be made therein without departing from the spirit and scope of the invention as defined by the appended claims. For example, with few modifications, the interface detector could be used in direct chill-type casters for non-ferrous metals.

We claim:

1. In a continuous casting machine including a source of molten material, a continuous casting mold for casting the molten material, and a cooling zone, downstream of the continuous casting mold for cooling and solidifying material extruding from the mold, a device for imaging a liquid material/solid material interface in the partially solidified material comprising:

a radiation source generating electromagnetic radiation for penetrating the partially solidified material;

at least one detector for detecting the electromagnetic radiation passing through the partially solidified material, and determining at least two-dimensional images of the liquid material/solid material interface by detecting levels of electromagnetic radiation penetrating the partially solidified material along different paths through partially solidified material and combining the detected levels of radiation to reconstruct the at least two dimensional images.

2. A device as claimed in claim 1, wherein the detector is adapted for detecting a level of the electromagnetic radiation.

3. A device as claimed in claim 1, wherein the source of molten material is a tundish.

4. A device as claimed in claim 1, wherein the cooling zone includes water jets for spraying water onto the partially solidified material.

5. A device as claimed in claim 1, wherein the detector is adapted for reconstructing the two-dimensional images of the liquid material/solid material interface by relying on different electromagnetic radiation attenuation characteristics of the solid material and the liquid material.

6. A device as claimed in claim 1, further comprising a collimator for collimating and guiding the electromagnetic radiation from the radiation source through the partially solidified material.

7. A device as claimed in claim 1, further comprising a scattering detector for detecting the electromagnetic radiation scattered by the partially solidified material.

8. A device as claimed in claim 1, wherein the trajectories of the paths is selected to enable tomographic reconstruction of the image.

9. A device as claimed in claim 1, further comprising a movable support for scanning the radiation source and detector over the partially solidified material during extrusion of the material from the mold.

10. A device as claimed in claim 1, further comprising a controller, responsive to the detector, for controlling the casting machine in response to a detected degree of solidification of the strand.

11. A device as described in claim 10, wherein the controller is adapted for controlling at least one of a rate of withdrawal of the strand, coolant flow to the strand, and a temperature of molten metal provided into the continuous casting mold in response to the detected degree of solidification of the strand.

12. A device as described in claim 10, wherein the detector is adapted to determine the degree of solidification of the strand in response to attenuation of the gamma radiation by the partially solidified strand.

13. A device as claimed in claim 1, wherein the electromagnetic radiation is gamma radiation.

14. A device as claimed in claim 13, wherein the gamma radiation is essentially comprised of γ-rays having energies of greater than a million electron Volts.

15. A device as claimed in claim 1, further comprising a movable support for carrying the radiation source and the detector and for moving the radiation source and the detector along the partially solidified material to enable detection of radiation levels along the different paths.

16. A device as claimed in claim 15, wherein the detector is adapted for determining a longitudinal two-dimensional image of the liquid material/solid material interface by comparing attenuation of the electromagnetic radiation along paths spaced longitudinally along the partially solidified material.

17. A device as claimed in claim 16, wherein the radiation source and the detector are adapted for rotation around the partially solidified material.

18. A device as claimed in claim 15, wherein the detector is adapted for determining a horizontal two-dimensional image of the liquid material/solid material interface in response to the horizontal rotation of the radiation source and the detector around partially solidified material.

19. A device for imaging a liquid metal/solid metal interface in a partially solidified strand in a continuous casting machine, the device comprising:
 a radiation source for generating gamma radiation, the radiation passing through the partially solidified strand extruded from a continuous casting mold;
 a detector for detecting the gamma radiation passing through the partially solidified strand to determine an image of the liquid metal/solid metal interface by relying on the different gamma radiation attenuation characteristics of the solid metal and the liquid metal and by combining the detected levels of the gamma radiation from different paths through the partially solidified strand; and
 a support for moving at least one of the detector and the radiation source to generate information from the paths through the partially solidified strand.

20. A device as claimed in claim 19, further comprising a tundish for supplying liquid metal.

21. A device as claimed in claim 19, further comprising a cooling zone having water jets for spraying water onto the partially solidified strand.

22. A device as claimed in claim 19, further comprising a collimator for collimating and guiding the gamma radiation from the radiation source through the partially solidified strand.

23. A device as claimed in claim 19, further comprising a scattering detector for detecting the elecromagnetic radiation scattered by the partially solidified strand to determine a composition of the strand.

24. A device as claimed in claim 19, wherein the support is adapted for scanning the detector and radiation source relative to the continuous casting machine and over the strand.

25. A device as claimed in claim 19, wherein the gamma radiation is essentially comprised of γ-rays having energies of greater than a million electron Volts.

26. A device as claimed in claim 25, wherein the gamma radiation is essentially comprised of gamma rays having energies between five and ten million electron Volts.

27. A device as claimed in claim 19, wherein the support includes a track for carrying the radiation source and the detector and for enabling the radiation source and the detector to move along the partially solidified strand.

28. A device as claimed in claim 27, wherein the detector is adapted for determining a longitudinal profile of the liquid metal/solid metal interface by comparing the attenuation of the gamma radiation along paths spaced longitudinally along the partially solidified strand.

29. A device as claimed in claim 19, wherein the support is adapted to rotate the radiation source and the detector around the partially solidified strand.

30. A device as claimed in claim 29, wherein the detector is adapted for determining a horizontal profile of the liquid metal/solid metal interface in response to horizontal rotation of the radiation source and detector.

31. A method for imaging a liquid metal/solid metal interface in a partially solidified strand extruding from a continuous casting mold, the method comprising:
 illuminating the partially solidified strand with penetrating radiation;
 repeatedly detecting levels of the radiation passing through the partially solidified strand along different paths through the strand; and
 combining attenuation information from the different paths through the partially solidified strand to reconstruct an image of the liquid metal/solid metal interface.

32. A method as described in claim 31, further comprising
 detecting the electromagnetic radiation scattered by the partially solidified strand; and
 determining an elemental composition within the strand from the scattered radiation.

33. A method as described in claim 31, further comprising tomographically reconstructing the image by controlling trajectories of the different paths.

34. A method as described in claim 31, further comprising scanning a radiation source and detector over the strand during extrusion from the mold.

* * * * *